United States Patent
Matsui et al.

(10) Patent No.: US 10,247,587 B2
(45) Date of Patent: Apr. 2, 2019

(54) OPERATION INPUT DETECTION DEVICE (71) Applicant: AISIN SEIKI KABUSHIKI KAISHA, Kariya-shi (JP)

(72) Inventors: Seika Matsui, Kariya (JP); Junya Nakamura, Kuwana (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/741,382

(22) PCT Filed: Jun. 29, 2016

(86) PCT No.: PCT/JP2016/069244
§ 371 (c)(1),
(2) Date: Jan. 2, 2018

(87) PCT Pub. No.: WO2017/022377
PCT Pub. Date: Feb. 9, 2017

(65) Prior Publication Data
US 2018/0195885 A1 Jul. 12, 2018

(30) Foreign Application Priority Data
Aug. 4, 2015 (JP) .................................. 2015-154582

(51) Int. Cl.
*G01D 18/00* (2006.01)
*B60R 25/31* (2013.01)
(Continued)

(52) U.S. Cl.
CPC .......... *G01D 18/006* (2013.01); *B60R 25/31* (2013.01); *E05B 81/56* (2013.01); *E05B 81/77* (2013.01);
(Continued)

(58) Field of Classification Search
CPC ............ G01D 5/24; E05B 81/77; B60R 25/31
See application file for complete search history.

(56) References Cited

U.S. PATENT DOCUMENTS

| | | | | |
|---|---|---|---|---|
| 6,812,823 B2 * | 11/2004 | Inaba | ...................... | B60R 25/00 340/5.6 |
| 2008/0122454 A1 * | 5/2008 | Kato | ...................... | G01D 3/032 324/661 |

(Continued)

FOREIGN PATENT DOCUMENTS

JP 5106533 B2 12/2012

OTHER PUBLICATIONS

International Search Report dated Sep. 6, 2016 in PCT/JP2016/069244 filed Jun. 29, 2016.
(Continued)

*Primary Examiner* — Jermele M Hollington
*Assistant Examiner* — Alvaro Fortich
(74) *Attorney, Agent, or Firm* — Oblon, McClelland, Maier & Neustadt, L.L.P.

(57) ABSTRACT

An operation input detection device includes an operation input section, a capacitive sensor, an operation input detecting section, and a sensor calibration section, which executes calibration of the capacitive sensor. The sensor calibration section includes an irregular calibration section. The irregular calibration section executes the calibration if the sensor output that has changed in the same direction as when the object to be detected approaches the operation input section exceeds a first threshold value, and the sensor output subsequently changes in the opposite direction and exceeds a second threshold value set in the opposite direction within a predetermined time.

6 Claims, 8 Drawing Sheets

(51) Int. Cl.
    *E05B 83/18*      (2014.01)
    *H01H 36/00*      (2006.01)
    *E05B 81/56*      (2014.01)
    *G01D 5/24*      (2006.01)
    *E05B 81/64*      (2014.01)

(52) U.S. Cl.
    CPC ............... *E05B 83/18* (2013.01); *G01D 5/24* (2013.01); *H01H 36/00* (2013.01); *E05B 81/64* (2013.01); *E05Y 2400/44* (2013.01); *E05Y 2400/45* (2013.01); *E05Y 2400/86* (2013.01); *E05Y 2900/546* (2013.01)

(56) References Cited

U.S. PATENT DOCUMENTS

2010/0214112 A1    8/2010   Ishihara et al.
2012/0056630 A1*   3/2012   Itou ....................... G01P 15/125
                                                                               324/679

OTHER PUBLICATIONS

International Preliminary Report on Patentability and Written Opinion dated Feb. 6, 2018 in PCT/JP2016/069244 filed Jun. 29, 2016 (English translation only).

* cited by examiner

OPERATION INPUT DETECTION DEVICE

TECHNICAL FIELD

The present invention relates to an operation input detection device.

BACKGROUND ART

Conventionally, operation input detection devices have been proposed that detect operation input to an operation input section on a vehicle surface based on a sensor output of a capacitive sensor that changes when an object to be detected approaches or separates from the operation input section. For example, Patent Document 1 discloses a configuration that is capable of locking/unlocking a door in a non-contact manner by detecting the hand of a user approaching the door handle of a vehicle. This configuration increases the convenience.

The operation input detection devices for a vehicle are exposed to an abrupt environmental change and are likely to cause an offset (deviation) in the sensor output of the capacitive sensor. However, in this case also, a new reference may be set for the sensor output by executing calibration. This reliably maintains the detection sensitivity of the operation input.

PRIOR ART DOCUMENT

Patent Document

Patent Document 1: Japanese Patent No. 5106533

SUMMARY OF THE INVENTION

Problems that the Invention is to Solve

However, under the actual use environment, for example, calibration of the capacitive sensor may possibly be executed under influences of objects located in the vicinity of the vehicle such as people, walls, or plants. If the calibration is repeated at short intervals to avoid a decrease in the sensitivity and erroneous detections, power consumption is increased. This undesirably decreases the stored energy of the vehicle-mounted power source (battery). In this respect, there remains room for improvement.

Accordingly, it is an objective of the present invention to provide an operation input detection device that is capable of setting a reference for a sensor output of a capacitive sensor in a more suitable manner.

Means for Solving the Problems

To achieve the above objective, an operation input detection device includes an operation input section, a capacitive sensor, an operation input detecting section, and a sensor calibration section. The operation input section is configured to be provided on a vehicle surface. A sensor output of the capacitive sensor changes as an object to be detected approaches or separates from the operation input section. The operation input detecting section detects operation input to the operation input section based on the sensor output of the capacitive sensor. The sensor calibration section executes calibration of the capacitive sensor. The sensor calibration section includes an irregular calibration section. The irregular calibration section executes the calibration if the sensor output that has changed in the same direction as when the object to be detected approaches the operation input section exceeds a first threshold value, and the sensor output subsequently changes in an opposite direction and exceeds a second threshold value set in the opposite direction within a predetermined time.

MODES FOR CARRYING OUT THE INVENTION

An operation input detection device according to one embodiment will now be described with reference to the drawings.

Figure 1:
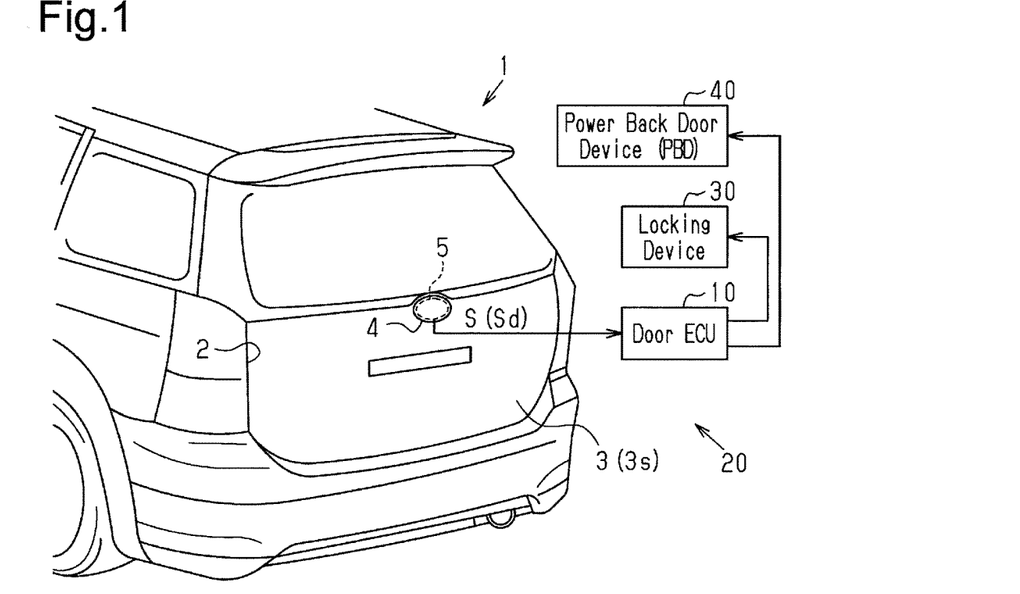
FIG. 1 is a schematic diagram of an emblem switch provided on a vehicle back door.

As shown in FIG. 1, a door opening 2 is provided at the rear end of a vehicle 1. A flip-up back door 3 is provided at the door opening 2. The flip-up back door 3 is opened and closed with the upper-end portion of the back door 3 serving as a rotational center. An emblem 4 of the vehicle 1 is provided on an outer surface 3s of the back door 3. In the vehicle 1, the emblem 4 constitutes an operation input section for opening the back door 3.

More specifically, in the present embodiment, a capacitive sensor 5 is provided on the inner side of the emblem 4. A detection value Sd of a sensor output S of the capacitive sensor 5 is input to a door electronic control unit (ECU) 10. In the vehicle 1 of the present embodiment, the door ECU 10 is configured to function as an operation input detecting section for detecting operation input to the emblem 4.

The door ECU 10 includes, for example, one or more dedicated hardware circuits and/or one or more processors (control circuits) that operate in accordance with computer programs (software). That is, the door ECU 10 includes electric circuitry programmed to execute desired processes. The processors include a CPU and memories such as a RAM and a ROM. The memories store program codes or commands that are configured to make the associated processor execute the process. The memories, that is, computer-readable media include any available media that can be accessed through a general-purpose or dedicated computer.

The sensor output S of the capacitive sensor 5 changes as an object to be detected approaches or separates from the emblem 4. The door ECU 10 detects, for example, approaching operation input to the emblem 4 (for example, holding a hand over the emblem 4) based on the sensor output S of the capacitive sensor 5. In the vehicle 1 of the present embodiment, this constitutes an emblem switch 20, which serves as the operation input detection device.

More specifically, when the operation input to the emblem 4 is detected, the door ECU 10 of the present embodiment opens a locking device 30 on the back door 3 on condition that, for example, security requirements of an electronic key or a like device are satisfied. The vehicle 1 of the present embodiment is provided with a power back door device (PBD) 40, which is driven by a non-illustrated motor. The door ECU 10 controls the operation of the power back door device 40 to open the back door 3.

Figure 2:
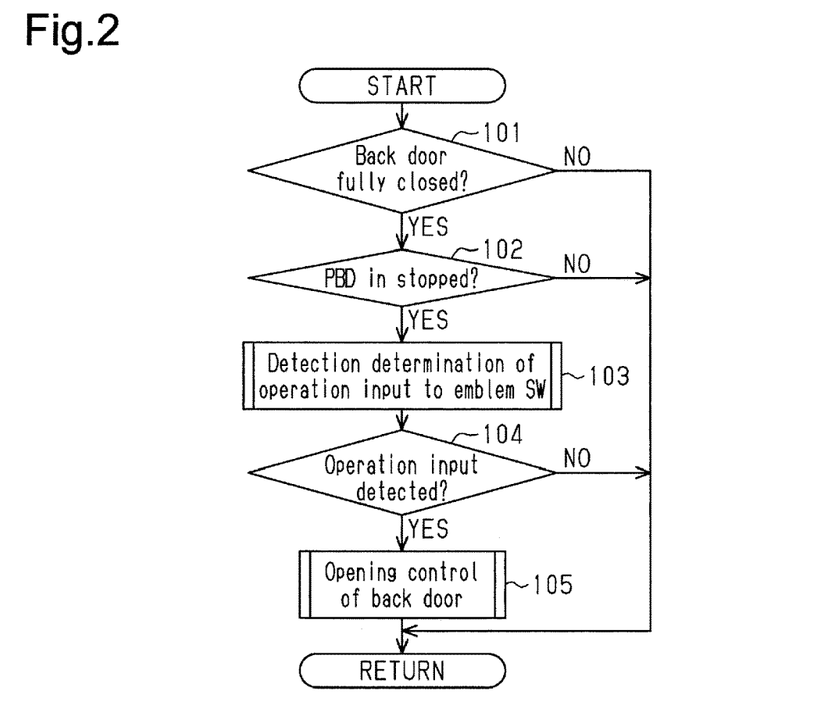
FIG. 2 is a flowchart of a routine for controlling opening of the back door using the emblem switch.

More specifically, as shown in the flowchart of FIG. 2, if the back door is fully closed (step 101: YES), and the power back door device 40 is in a stopped state (step 102: YES), the door ECU 10 of the present embodiment executes detection determination of the operation input to the emblem (step 103). If the operation input to the emblem 4 is detected (step 104: YES), the door ECU 10 executes opening control of the back door 3 (step 105).

Calibration of Capacitive Sensor

Calibration of the capacitive sensor 5 executed by the door ECU 10 of the present embodiment will now be described.

The door ECU 10 of the present embodiment is configured to function as a sensor calibration section, which executes calibration of the capacitive sensor 5 to set the reference for the sensor output S of the capacitive sensor 5.

Figure 3:
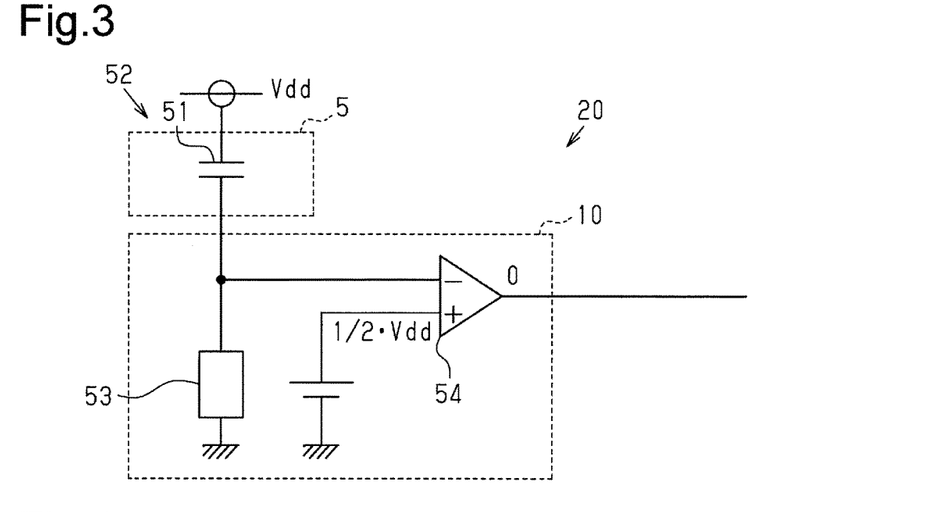
FIG. 3 is an explanatory circuit diagram of the function of the door ECU, which serves as a sensor calibration section for executing calibration of a capacitive sensor.

More specifically, as shown in FIG. 3, the door ECU 10 of the present embodiment includes an adjusting circuit 53. The adjusting circuit 53 constitutes a series circuit 52 with a capacitor (detection channel) 51, which is constituted by the electrodes (not shown) of the capacitive sensor 5. The door ECU 10 includes a comparator (operational amplifier) 54. The comparator 54 receives the midpoint potential of the series circuit 52 and the ½ potential (½×Vdd) of the power source voltage (Vdd) applied to the series circuit 52. The door ECU 10 of the present embodiment executes calibration of the capacitive sensor 5 by causing the adjusting circuit 53 to operate such that the output of the comparator 54 is 0.

Figure 4:
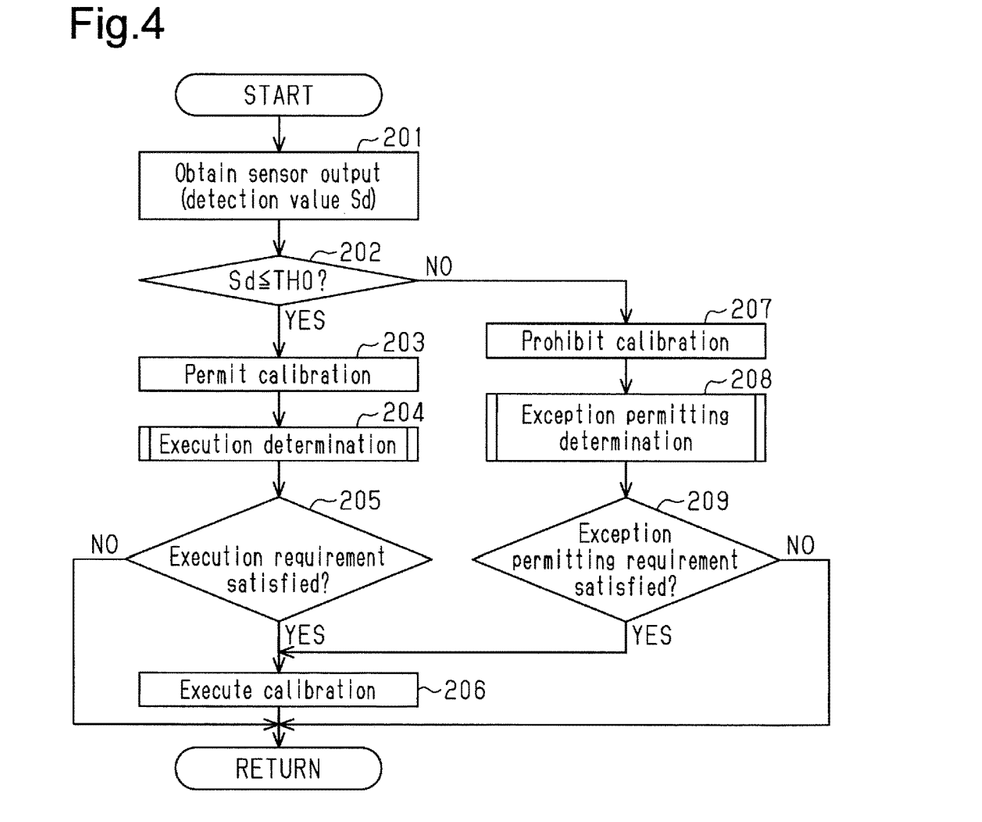
FIG. 4 is a flowchart of a routine for executing calibration.

Even more specifically, as shown in the flowchart of FIG. 4, if the door ECU 10 of the present embodiment obtains the detection value Sd of the sensor output S of the capacitive sensor 5 in a predetermined computation cycle (step 201), the door ECU 10 determines whether the detection value Sd of the sensor output S is less than or equal to a predetermined threshold value TH0 (step 202). If the detection value Sd of the sensor output S is less than or equal to the threshold value TH0 (Sd≤TH0, step 202: YES), the door ECU 10 permits execution of the calibration as described above (step 203).

Subsequent to the permission determination of the above-described step 203, the door ECU 10 of the present embodiment performs execution determination of the calibration (step 204). If a predetermined execution requirement is satisfied (step 205: YES), the door ECU 10 executes the calibration of the capacitive sensor 5 (step 206).

For example, in the execution determination of the calibration in the above-described step 204, the door ECU 10 of the present embodiment determines whether it is a point in time for executing the periodic calibration, which is set in accordance with predetermined intervals. That is, the door ECU 10 is configured to function as an execution confirmation determining section.

Figure 5:
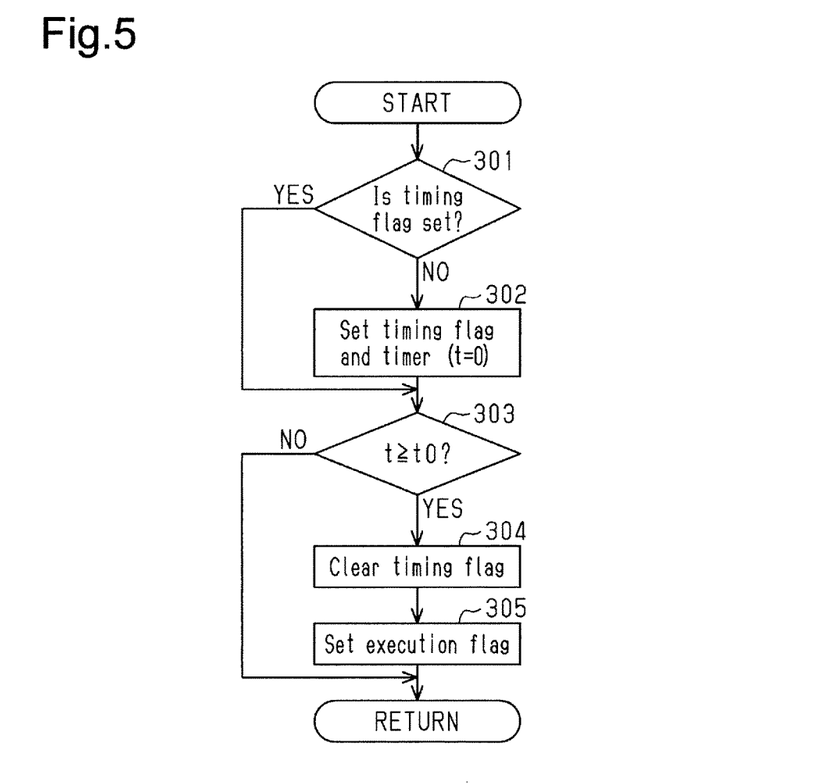
FIG. 5 is a flowchart of a routine for periodic calibration.

More specifically, as shown in the flowchart of FIG. 5, the door ECU 10 first determines whether a timing flag is set (step 301). If the timing flag is not set (step 301: NO), the door ECU 10 sets the timing flag and sets a timer (step 302). If the timing flag is already set (step 301: YES), the process of step 302 is not executed.

Next, the door ECU 10 determines whether an elapsed time t from when the timing flag is set has reached a predetermined time t0, which is previously set as the execution interval of the periodic calibration (step 303). If the elapsed time t has reached the predetermined time t0 (t≥t0, step 303: YES), the door ECU 10 clears the timing flag (step 304) and sets an execution flag indicating that it is the point in time for executing the periodic calibration, that is, the execution requirement for the calibration is satisfied (step 305).

In the above-described step 303, if the elapsed time t has not reached the predetermined time t0 (t<t0, step 303: NO), the door ECU 10 does not execute the processes of the above-described steps 304 and 305.

Also, as shown in FIG. 4, in the above-described step 202, if the detection value Sd of the sensor output S exceeds a prohibition threshold value, which is the threshold value TH0 in this embodiment (Sd>TH0, step 202: NO), the door ECU 10 of the present embodiment prohibits execution of the calibration for the capacitive sensor 5 (step 207).

Figure 6:
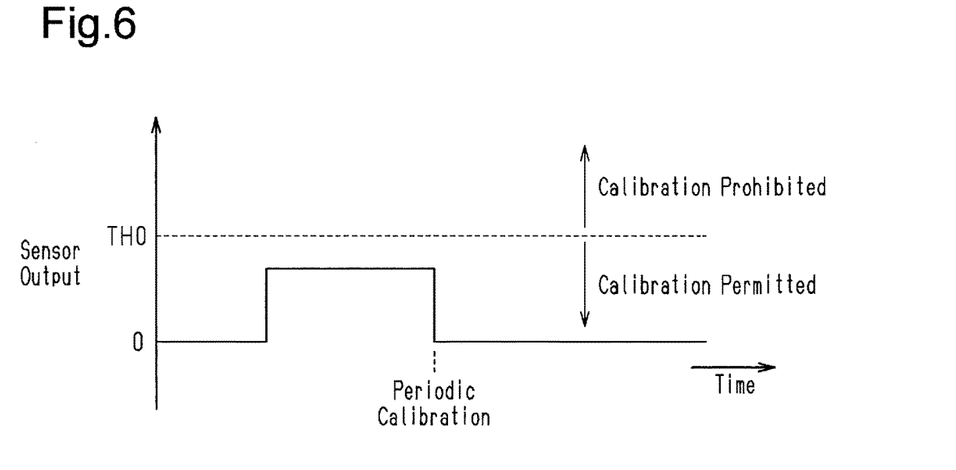
FIG. 6 is an explanatory diagram of a case in which execution of calibration is permitted.

That is, as shown in FIG. 6, the emblem switch 20 of the present embodiment is configured such that if an object to be detected approaches the operation input section, which is the emblem 4 in this embodiment, the sensor output S (Sd) of the capacitive sensor 5 changes upward in the drawing, that is, upward from the zero point, which serves as the reference for the sensor output S (in the present embodiment, the positive direction). The door ECU 10 of the present embodiment sets the threshold value TH0 as the above-described prohibition threshold value in the changing direction (upward in FIG. 6) that is the same as when the object to be detected approaches the emblem 4. In the present embodiment, with this configuration, the region beyond the threshold value TH0 serves as a prohibition region in which calibration of the capacitive sensor 5 is not performed.

That is, if the detection value Sd of the sensor output S is in the prohibition region beyond the threshold value TH0, the door ECU 10 of the present embodiment preferentially detects the operation input based on the sensor output S than the calibration of the capacitive sensor 5. This configuration prevents the execution of calibration from hindering detection of the operation input based on the sensor output S of the capacitive sensor 5.

As shown in FIG. 4, although the detection value Sd of the sensor output S is in the prohibition region exceeding the prohibition threshold value, which is the threshold value TH0 in this embodiment (step 202: NO), the door ECU 10 of the present embodiment determines whether calibration of the capacitive sensor 5 should be permitted as an exception (exception permitting determination, step 208). If a predetermined exception permitting requirement is satisfied (step 209: YES), the door ECU 10 executes calibration of the capacitive sensor 5 in the above-described step 206.

Figure 7:
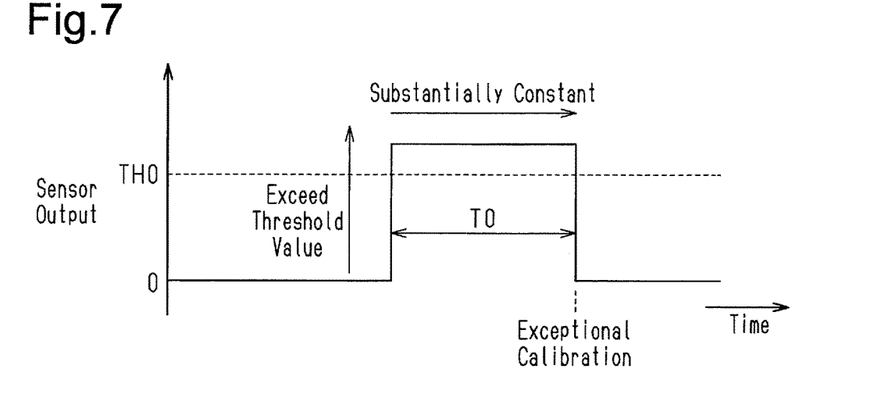
FIG. 7 is an explanatory diagram of a case in which execution of calibration is permitted as an exception.

More specifically, as shown in FIG. 7, the door ECU 10 of the present embodiment determines whether the sensor output S of the capacitive sensor 5 has been substantially constant for a predetermined time or more after exceeding the prohibition threshold value, which is the threshold value TH0 in this embodiment. If the exception permitting requirement is satisfied, the door ECU 10 immediately executes the calibration of the capacitive sensor 5 without waiting for the point in time at which the periodic calibration is executed.

Figure 8:
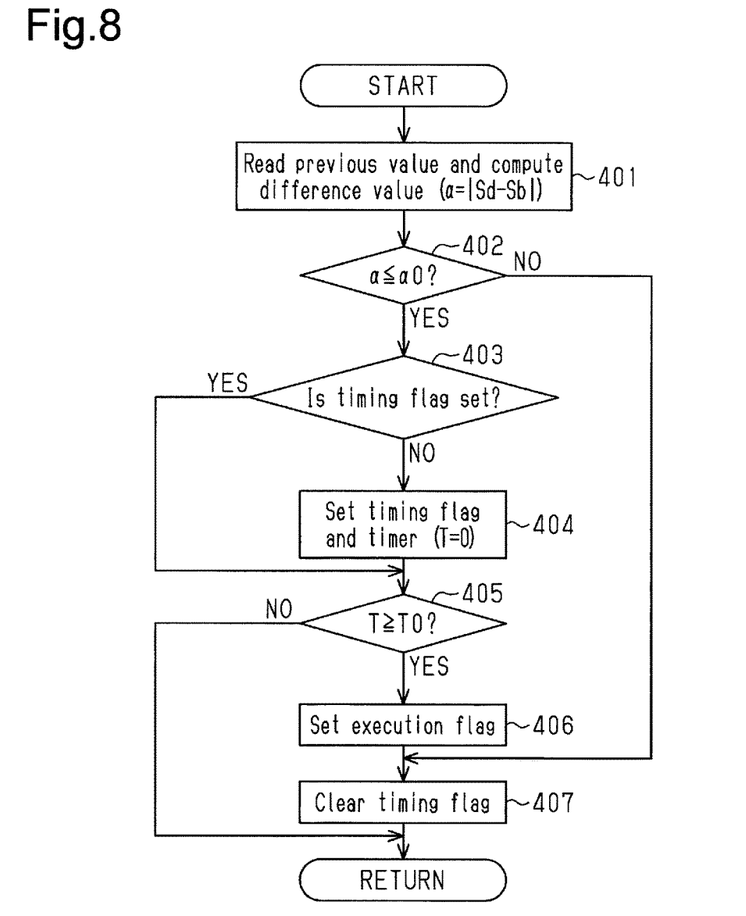
FIG. 8 is a flowchart of a routine for exception permitting determination.

More specifically, as shown in the flowchart of FIG. 8, in the exception permitting determination (refer to FIG. 4, step 208), the door ECU 10 of the present embodiment first reads a previous value Sb of the sensor output S detected in the previous sampling cycle and computes a difference value $\alpha$ between the previous value Sb and a current detection value Sd ($\alpha=|Sd-Sb|$, step 401). The door ECU 10 then determines whether the difference value $\alpha$ is less than or equal to a predetermined threshold value $\alpha 0$ (step 402).

In step 402, if the door ECU 10 determines that the difference value $\alpha$ is less than or equal to the predetermined threshold value $\alpha 0$ ($\alpha \leq \alpha 0$, step 402: YES), the door ECU 10 subsequently determines whether a timing flag is set (step 403). If the timing flag is not set (step 403: NO), the door ECU 10 sets the timing flag and sets a timer (step 404). If the timing flag is already set (step 403: YES), the door ECU 10 does not execute the process of step 404.

Next, the door ECU 10 determines whether the elapsed time T from when the timing flag is set has reached a predetermined time T0, which is previously set as the above-described exception permitting requirement (step 405). If the elapsed time T has reached the predetermined time T0 ($T \geq T0$, step 405: YES), the door ECU 10 sets an execution flag indicating that the calibration should be executed since the exception permitting requirement has been satisfied (step 406) and clears the timing flag (step 407).

In the above-described step 405, if the elapsed time T has not reached the predetermined time T0 (T<T0, step 405: NO), the door ECU 10 does not execute the processes of the above-described steps 406 and 407. In the above-described step 402, if it is determined that the difference value $\alpha$ of the sensor output S has exceeded the predetermined threshold value $\alpha 0$ ($\alpha > \alpha 0$, step 402: NO), the door ECU 10 clears the timing flag in step 407 without executing the processes of the above-described steps 403 to 406.

Figure 9A:
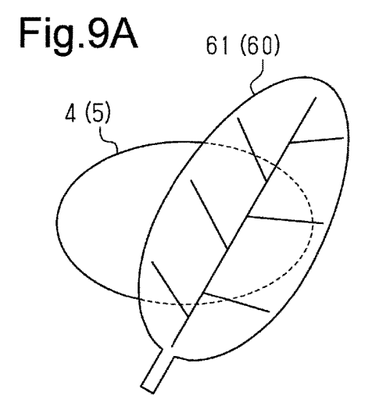
FIGS. 9A and 9B are explanatory diagrams of sticking of a leaf to an emblem, which is an operation input section.
Figure 9B:
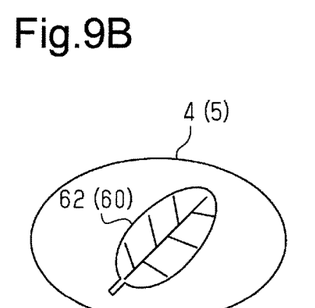

That is, the emblem switch 20 of the present embodiment is configured such that the sensor output S of the capacitive sensor 5 is changed even if a foreign matter 60, such as a leaf (61, 62) of a plant that is wet by rainwater, sticks to the operation input section, which is the emblem 4 in this embodiment, as shown in FIGS. 9A and 9B.

More specifically, as shown in FIG. 9A, if a relatively large leaf 61 sticks in such a manner that the leaf 61 lies over the emblem 4 and the outer surface 3s of the back door 3 constituting the vehicle surface, the ground connection is generated. This causes the sensor output S of the capacitive sensor 5 to change in the same direction as when the operation input is generated (refer to FIG. 11, upward in the drawing). As shown in FIG. 9B, if a relatively small leaf 62 sticks in such a manner that the leaf 62 lies within the frame of the emblem 4, relative permittivity is increased. This causes the sensor output S of the capacitive sensor 5 to change in the opposite direction from when the operation input is generated (refer to FIG. 10, downward in the drawing, the negative direction in the present embodiment). The door ECU 10 of the present embodiment executes the calibration of the capacitive sensor 5 by the routine described above so as to reduce the occurrence of erroneous detection caused due to the sticking of the foreign matter 60 as described above and to avoid a decrease in the sensitivity of the operation input detection.

Figure 10:
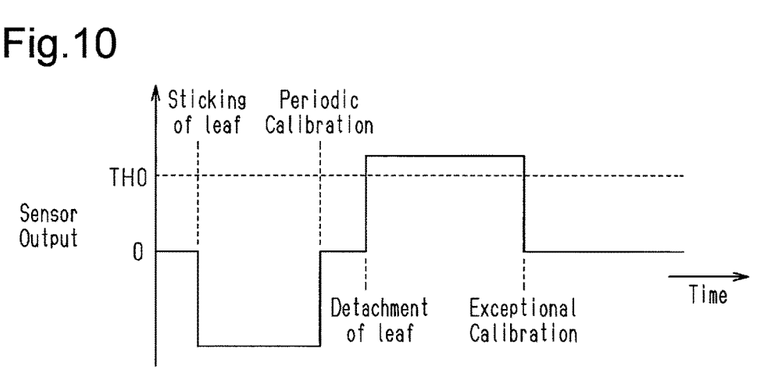
FIG. 10 is a timing diagram of changes in the sensor output when a small leaf sticks to the emblem and then is detached from the emblem.

For example, as shown in FIG. 10, even if the small leaf 62 sticks to the emblem 4 (refer to FIG. 9B), and the sensor output S of the capacitive sensor 5 changes in the opposite direction from when the operation input is generated, a new reference appropriate for such a state is set for the sensor output S of the capacitive sensor 5 by the execution of the periodic calibration.

Furthermore, if the small leaf 62 stuck to the emblem 4 is then detached, the sensor output S of the capacitive sensor 5 changes in the same direction as when the operation input is generated. In the case of this example, if the detection value Sd of the sensor output S exceeds the prohibition threshold value, which is the threshold value TH0 in this embodiment, execution of the above-described periodic calibration is prohibited.

However, in the emblem switch 20 of the present embodiment, if the sensor output S that exceeds the threshold value TH0 is substantially constant for the predetermined time T0, the calibration is executed with this situation referred to as an exceptional permissible condition (exceptional calibration).

That is, the sensor output S of the capacitive sensor 5 that is changed by the sticking of the foreign matter 60 to the emblem 4 or the detachment of the foreign matter 60 from the emblem 4 does not cause fluctuation as seen in the case of the user's hand performing the operation input. The door ECU 10 of the present embodiment focuses on this point and detects an offset (deviation) of the sensor output S caused by the sticking or detachment of the foreign matter 60 to or from the emblem 4. In the emblem switch 20 of the present embodiment, upon detection of the offset, a new reference is set for the sensor output S of the capacitive sensor 5.

Figure 11:
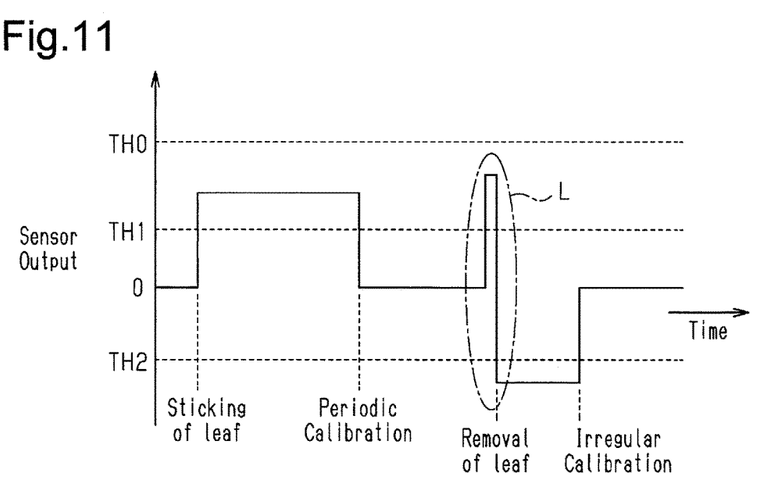
FIG. 11 is a timing diagram of changes in the sensor output when a large leaf sticks to the emblem and then is removed from the emblem.

Similarly, for example, as shown in FIG. 11, if the large leaf 61 sticks to the emblem 4 (refer to FIG. 9A), and the sensor output S of the capacitive sensor 5 is changed in the same direction as when the operation input is generated, a new reference appropriate for such a state is set for the sensor output S of the capacitive sensor 5 by the execution of the periodic calibration.

Furthermore, if the leaf 61 stuck to the emblem 4 is removed from such a state, the sensor output S of the capacitive sensor 5 is changed in the opposite direction from when the operation input is generated. In this case also, the emblem switch 20 of the present embodiment is configured such that a new reference appropriate for the state in which the foreign matter 60 is not stuck to the emblem 4 is set for the sensor output S of the capacitive sensor 5 again by the execution of the periodic calibration.

However, in this case, the sensor output S of the capacitive sensor 5 is kept being changed in the opposite direction from when the operation input is generated until the periodic calibration is executed. That is, the state in which the sensitivity of the operation input detection is decreased is undesirably maintained.

Based on this point, the present embodiment focuses on the waveform shown in broken line circle L in FIG. 11 that appears in the sensor output S of the capacitive sensor 5 when someone removes the leaf 61 stuck to the emblem 4. That is, when someone picks the leaf 61 stuck to the emblem 4, the sensor output S of the capacitive sensor 5 momentarily changes in the same direction as when the operation input is generated. In a case in which such a first rising waveform and the subsequent falling waveform are generated, the door ECU 10 of the present embodiment also immediately executes the calibration of the capacitive sensor 5 (irregular calibration) without waiting for the point in time at which the periodic calibration is executed.

More specifically, an irregular calibration section, which is the door ECU 10 in this embodiment, requires that the detection value Sd of the sensor output S that is changed in the same direction as when the object to be detected approaches the emblem 4 exceed a first threshold value TH1 and that the sensor output S that is changed in the opposite direction then exceed a second threshold value TH2 within a predetermined time T1 as the execution requirement for the calibration performed after removal of the foreign matter 60.

In the present embodiment, when the detection value Sd of the sensor output S that has changed in the same direction as when the object to be detected approaches the emblem 4 (upward and in the positive direction in FIG. 11) becomes greater than the first threshold value TH1 (Sd>TH1), the detection value Sd exceeds the first threshold value TH1. Also, when the sensor output S that has changed in the direction opposite to the direction in which the sensor output S changes when the object to be detected approaches the emblem 4 from the reference (zero point) of the sensor output S (downward and in the negative direction in FIG. 11) becomes less than the second threshold value TH2 (Sd<TH2), the sensor output S exceeds the second threshold value TH2. The emblem switch 20 of the present embodiment thus accurately detects that the foreign matter 60 (the leaf 61) stuck to the emblem 4 is removed and is capable of promptly setting a new reference appropriate for the state in which the foreign matter 60 is not stuck to the emblem 4 for the sensor output S of the capacitive sensor 5.

Figure 12:
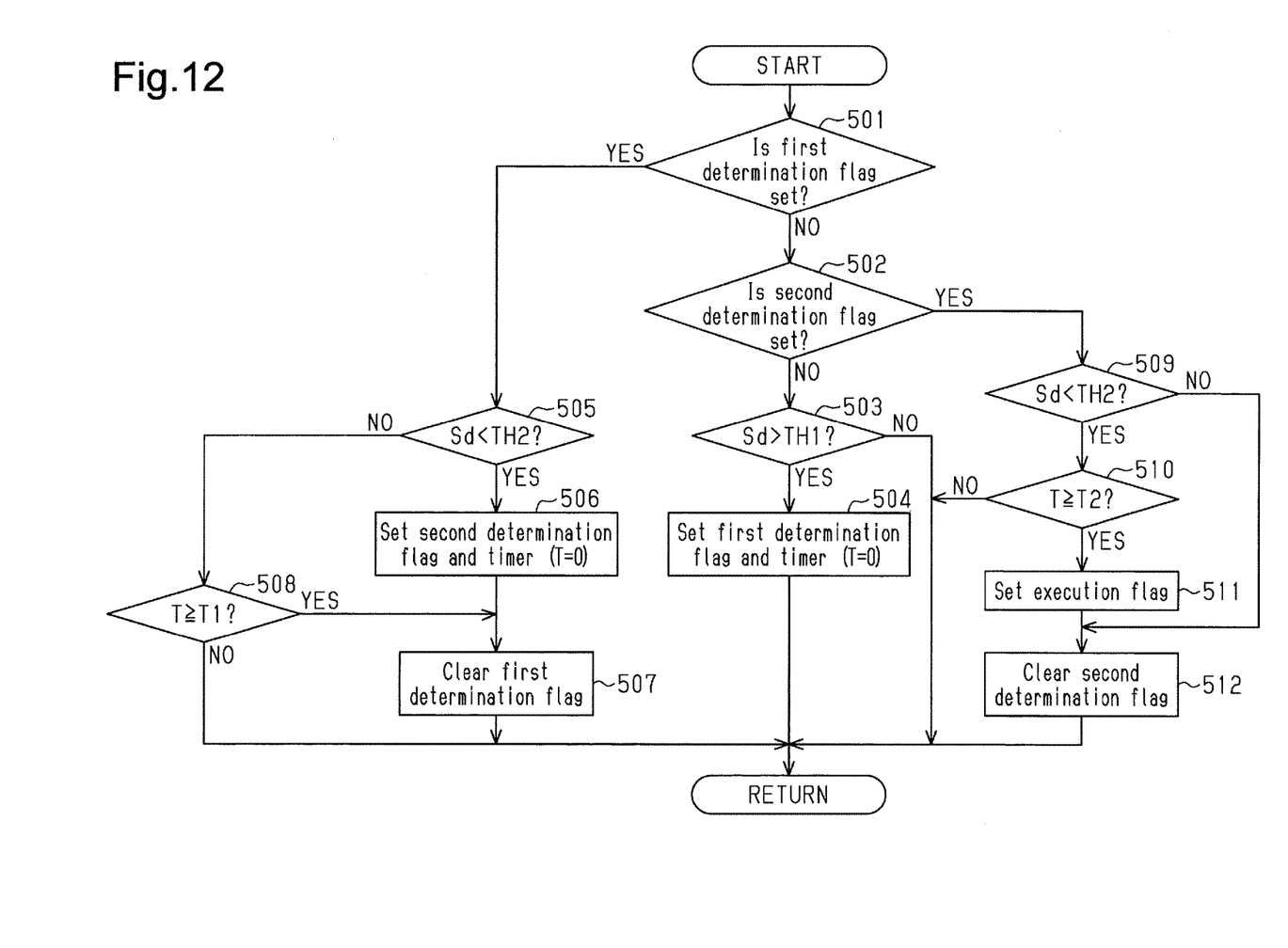
FIG. 12 is a flowchart of a routine for irregular calibration determination.

More specifically, as shown in the flowchart of FIG. 12, the door ECU 10 of the present embodiment first determines whether a first determination flag is set (step 501). If the first determination flag is not set (step 501: NO), the door ECU 10 subsequently determines whether a second determination flag is set (step 502). Furthermore, in step 502, if the second determination flag is not set (step 502: NO), the door ECU 10 determines whether the detection value Sd of the sensor output S is greater than the first threshold value TH1 (step 503). If the detection value Sd of the sensor output S is greater than the first threshold value TH1 (Sd>TH1, step 503: YES), the door ECU 10 sets the first determination flag and sets a timer (step 504).

In the above-described step 501, if the first determination flag is set (step 501: YES), the door ECU 10 subsequently determines whether the detection value Sd of the sensor output S is less than the second threshold value TH2 (step 505). If the detection value Sd of the sensor output S is less than the second threshold value TH2 (Sd<TH2, step 505: YES), the door ECU 10 sets the second determination flag, sets a timer (step 506), and clears the first determination flag (step 507).

If the detection value Sd of the sensor output S is not less than the second threshold value TH2 (Sd≥TH2, step 505: NO), the door ECU 10 determines whether the elapsed time T from when the first determination flag is set, that is, the elapsed time T from the point in time at which the above-described first rising waveform is caused has reached the predetermined time T1 (step 508). If the elapsed time T has reached the predetermined time T1 (T≥T1, step 508: YES), the door ECU 10 clears the first determination flag at step 507 without executing the process of the above-described step 506.

Also, in the above-described step 502, if the second determination flag is set (step 502: YES), the door ECU 10 determines whether the detection value Sd of the sensor output S is less than the second threshold value TH2 (step 509). Furthermore, if the detection value Sd of the sensor output S is less than the second threshold value TH2 (step 509: YES), the door ECU 10 subsequently determines whether the elapsed time T from when the second determination flag is set, that is, the elapsed time T from the point in time at which the falling waveform occurred after the rising has reached a predetermined time T2 (step 510). If the elapsed time T has reached the predetermined time T2 (T≥T2, step 510: YES), the door ECU 10 sets an execution flag indicating that the execution requirement for the irregular calibration performed after removal of the foreign matter 60 has been satisfied (step 511) and clears the second determination flag (step 512).

In the above-described step 503, if the detection value Sd of the sensor output S is less than or equal to the first threshold value TH1 (Sd≤TH1, step 503: NO), that is, if the first rising waveform is not detected, the door ECU 10 of the present embodiment does not execute the process of the above-described step 504. In the above-described step 508, if the elapsed time T from when the first rising waveform is caused has not reached the predetermined time T1 (T<T1, step 508: NO), the process of step 507 is not executed.

Also, in the above-described step 510, if the elapsed time T from when the falling waveform after the rising is caused has not reached the predetermined time T2 (T<T2, step 510: NO), the door ECU 10 of the present embodiment does not execute the processes of steps 511 and 512. In the above-described step 509, if the detection value Sd of the sensor output S is not less than the second threshold value TH2 (Sd≥TH2, step 509: NO), the door ECU 10 clears the second determination flag in step 512 without executing the processes of the above-described steps 510 and 511.

Initial Calibration of Capacitive Sensor

The initial calibration of the capacitive sensor 5 executed by the door ECU 10 of the present embodiment will now be described.

According to the emblem switch 20 of the present embodiment, the initial calibration section, which is the door ECU 10 in this embodiment, automatically executes the calibration in the initial state immediately after turning on the power connected to the vehicle-mounted power source (battery) and in which the reference for the sensor output S of the capacitive sensor 5 is not set.

Figure 14:
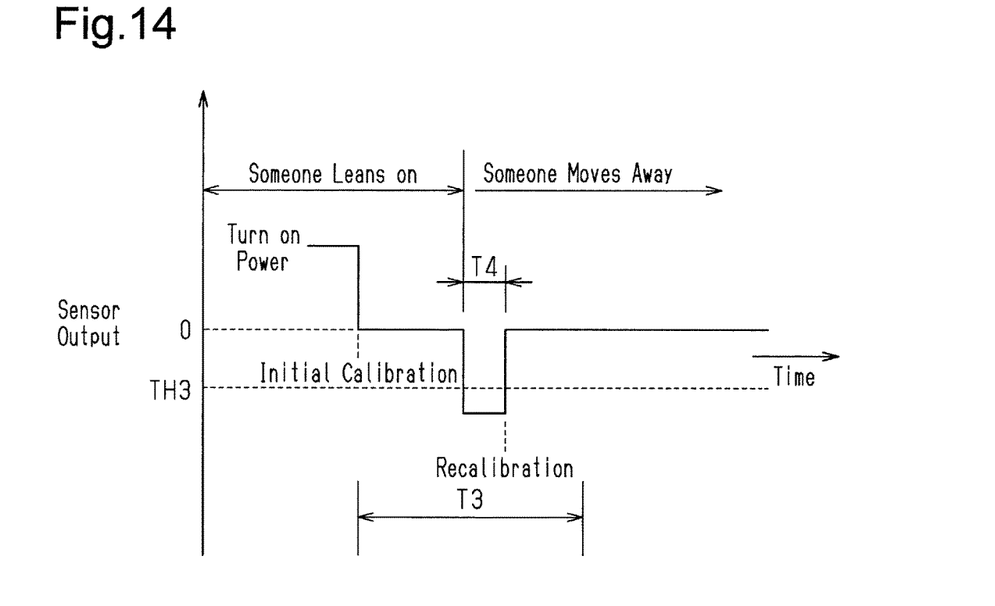
FIG. 14 is an explanatory diagram of a case in which recalibration is executed from the initial state.

More specifically, as shown in FIG. 14, after the execution of the first calibration, the door ECU 10 of the present embodiment monitors the sensor output S of the capacitive sensor 5 for which the reference is set by the execution of the calibration. In the case in which the detection value Sd of the sensor output S is changed in the opposite direction from when the object to be detected approaches the operation input section, which is the emblem 4 in this embodiment, and exceeds a recalibration threshold value set in the opposite direction, which is a threshold value TH3 in this embodiment, within a predetermined time T3, the door ECU 10 executes the calibration of the capacitive sensor 5 again.

In other words, according to the emblem switch 20 of the present embodiment, immediately after turning on the power, the reference for the sensor output S set by the first calibration is treated as a temporary setting state until the predetermined time T3 elapses. If the recalibration requirement as described above is not satisfied during this period of time, the reference setting for the sensor output S is confirmed.

If the recalibration requirement as described above is satisfied during the time period from the first calibration until the predetermined time T3 elapses, the calibration of the capacitive sensor 5 is executed again without waiting for the point in time at which the periodic calibration is executed. This configuration confirms the reference setting for the sensor output S.

Figure 13:
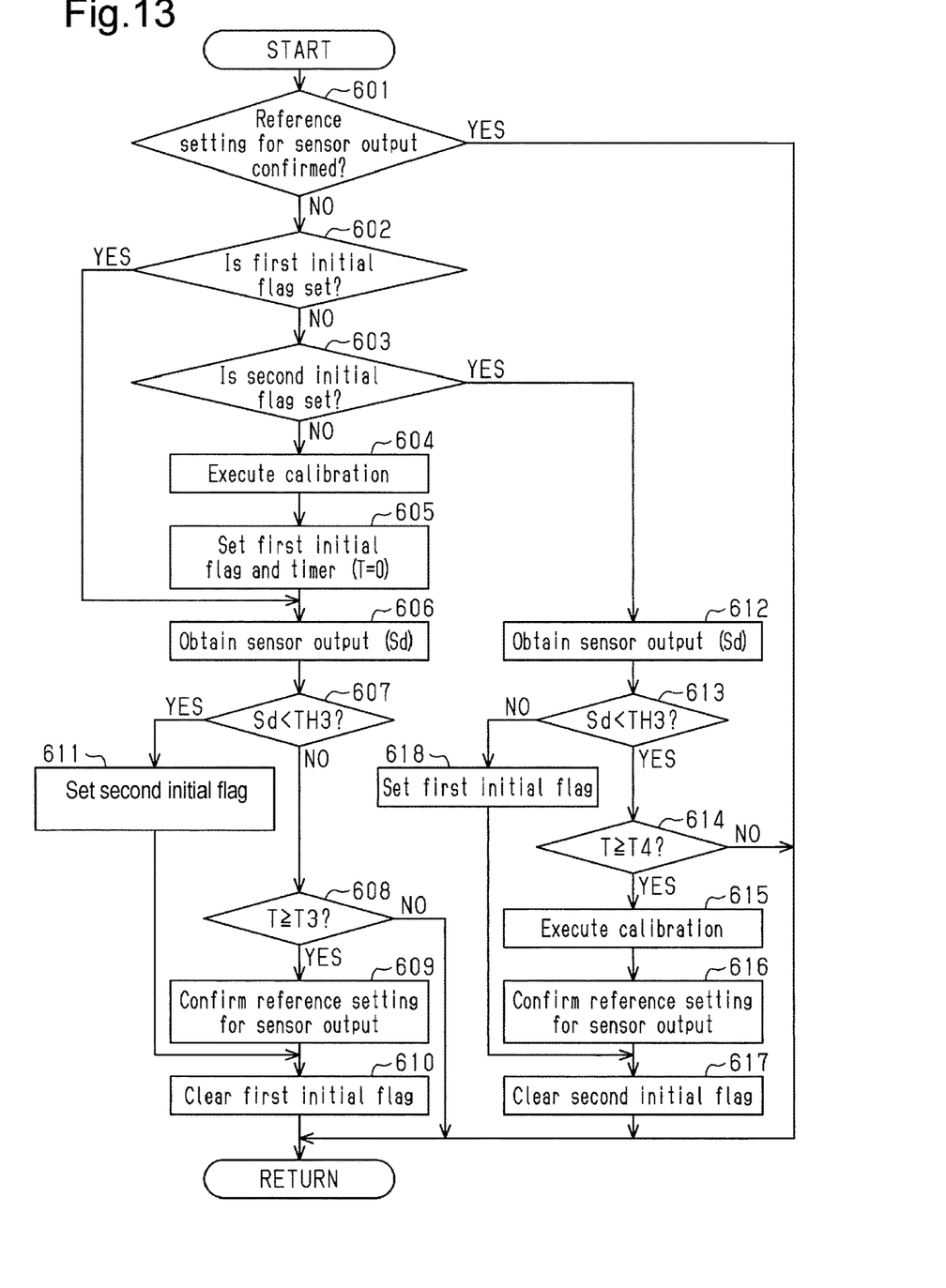
FIG. 13 is a flowchart of a routine for calibration in the initial state (when power is turned on).

More specifically, as shown in the flowchart of FIG. 13, the door ECU 10 of the present embodiment determines whether the setting of the sensor output S of the capacitive sensor 5 has already been confirmed (step 601). In step 601, if the reference setting for the sensor output S has not been confirmed (step 601: NO), the door ECU 10 subsequently determines whether a first initial flag is set (step 602). If the first initial flag is not set (step 602: NO), the door ECU 10 further determines whether a second initial flag is set (step 603). In step 603, if the second initial flag is not set (step 603: NO), the door ECU 10 executes the first calibration of the capacitive sensor 5 (step 604).

After execution of the calibration in step 604, the door ECU 10 of the present embodiment sets the first initial flag and sets a timer (step 605). In the above-described step 602, if the first initial flag is already set (step 602: YES), the door ECU 10 does not execute the processes of the above-described steps 603 to 605.

That is, the first initial flag indicates a state in which a change in the sensor output S that serves as a trigger for recalibration determination, that is, a change in the opposite direction from when the object to be detected approaches the operation input section, which is the emblem 4 in this embodiment, is not caused after the first calibration is performed. The second initial flag indicates a state after the occurrence of such a change in the sensor output S (refer to FIG. 14).

Next, the door ECU 10 of the present embodiment obtains the detection value Sd of the sensor output S of the capacitive sensor 5 (step 606) and subsequently determines whether the detection value Sd of the sensor output S is less than the predetermined threshold value TH3 (step 607). Also, in step 607, if it is determined that the detection value Sd of the sensor output S is not less than the predetermined threshold value TH3 (Sd≥TH3, step 607: NO), the door ECU 10 subsequently determines whether the elapsed time T from when the first initial flag is set, that is, the elapsed time T from the first calibration has reached the predetermined time T3 (step 608). If the elapsed time T has reached the predetermined time T3 (T≥T3, step 608: YES), the door ECU 10 confirms the reference setting for the sensor output S of the capacitive sensor 5 (step 609) and clears the first initial flag (step 610).

In the above-described step 608, if the elapsed time T has not reached the predetermined time T3 (T<T3, step 608: NO), the processes of the above-described steps 609 and 610 are not executed.

In the above-described step 607, if it is determined that the detection value Sd of the sensor output S is less than the predetermined threshold value TH3 (Sd<TH3, step 607: YES), the door ECU 10 sets a second initial flag and sets a timer (step 611). The door ECU 10 clears the first initial flag in step 610 without executing the processes of the above-described steps 608 and 609.

In the above-described step 603, if the second initial flag is set (step 603: YES), the door ECU 10 also obtains the detection value Sd of the sensor output S of the capacitive sensor 5 (step 612) and determines whether the detection value Sd of the sensor output S is less than the predetermined threshold value TH3 (step 613). Furthermore, in step 613, if it is determined that the detection value Sd of the sensor output S is less than the predetermined threshold value TH3 (Sd<TH3, step 613: YES), the door ECU 10 of the present embodiment subsequently determines whether the elapsed time T from when the second initial flag is set has reached a predetermined time T4 (step 614). If the elapsed time T has reached the predetermined time T4 (T≥T4, step 614: YES), the door ECU 10 executes the calibration of the capacitive sensor 5 again (recalibration, step 615) and confirms the reference setting for the sensor output S (step 616).

After the confirmation of the reference setting for the sensor output S in step 616, the door ECU 10 of the present embodiment clears the second initial flag (step 617). Also, in the above-described step 613, if it is determined that the detection value Sd of the sensor output S is not less than the predetermined threshold value TH3 (Sd≥TH3, step 613: NO), the door ECU 10 sets the first initial flag again (step 618) and then clears the second initial flag in step 617 without executing the processes of the above-described steps 614 to 616. Furthermore, in the above-described step 614, if the elapsed time T from when the second initial flag is set has not reached the predetermined time T4 (T<T4, step 614: NO), the processes of the above-described steps 615 to 617 are not executed. In the above-described step 601, if the reference setting for the sensor output S is already confirmed (step 601: YES), the processes of the above-described steps 602 to 618 are not executed.

Operation of the initial calibration executed by the door ECU 10 of the present embodiment will now be described.

As shown in FIG. 14, if the door ECU 10 executes the first calibration, for example, in a state in which an object to be detected is located in the vicinity of the emblem 4, which constitutes the operation input section, such as when someone is leaning on the back door 3 of the vehicle 1, the reference is set for the sensor output S of the capacitive sensor 5 under the influence of the object to be detected. That is, the reference is set for the sensor output S of the capacitive sensor 5 in a state offset from the original reference in the same direction (upward in the drawing) as when the operation input is generated.

That is, subsequently, when the object to be detected is no longer in the vicinity of the emblem 4, the sensor output S of the capacitive sensor 5 changes in the opposite direction (downward in the drawing) from when the operation input is generated. In this case, the state in which the sensitivity of the operation input detection is decreased is undesirably maintained until the periodic calibration is executed.

However, in the present embodiment, at this time, if the sensor output S that has changed in the opposite direction from when the operation input is generated exceeds or becomes less than the recalibration threshold value set in the opposite direction, which is the threshold value TH3 in this embodiment, the calibration of the capacitive sensor 5 is executed again. Thus, the emblem switch 20 of the present embodiment is configured to be capable of promptly setting the new reference for the sensor output S of the capacitive sensor 5.

The present embodiment achieves the following advantages.

(1) According to the operation input detection device, which is the emblem switch 20 in this embodiment, the door ECU 10 functions as the sensor calibration section, which executes the calibration of the capacitive sensor 5. The capacitive sensor 5 is located in the emblem 4, which constitutes the operation input section. The door ECU 10 executes the calibration of the capacitive sensor 5 if the detection value Sd of the sensor output S that has changed in the same direction as when the object to be detected approaches the emblem 4 exceeds the first threshold value TH1, and the sensor output S is subsequently changed in the opposite direction and exceeds the second threshold value TH2, which is set in the opposite direction, within the predetermined time T1.

That is, if someone who tries to remove the foreign matter 60 (for example, the leaf 61) stuck to the emblem 4 touches the foreign matter 60, the sensor output S of the capacitive sensor 5 abruptly changes in the same direction as when the object to be detected reaches the emblem 4, that is, when the operation input is generated. Upon removal of the foreign matter 60, the sensor output S abruptly changes in the opposite direction from when the operation input is generated. Thus, according to the above configuration, the calibration of the capacitive sensor 5 is executed by accurately detecting the removal of the foreign matter 60 stuck to the emblem 4. This configuration allows the new reference to be set promptly for the sensor output S of the capacitive sensor 5 while reducing the power consumption.

(2) The irregular calibration section, which is the door ECU 10 in this embodiment, executes the calibration of the capacitive sensor 5 if the sensor output S that has changed in the opposite direction from when the object to be detected approaches the emblem 4 continuously exceeds the second threshold value TH2 for the predetermined time T2 or more. Thus, the door ECU 10 more accurately detects the removal of the foreign matter 60 that has stuck to the emblem 4 and appropriately executes the calibration.

(3) If the sensor output S of the capacitive sensor 5 exceeds the predetermined threshold value TH0, which is the prohibition threshold value set in the same changing direction as when the object to be detected approaches the emblem 4, the calibration prohibition section, which is the door ECU 10 in this embodiment, prohibits the calibration of the capacitive sensor 5. In such a case in which the sensor output S of the capacitive sensor 5 exceeds the predetermined threshold value TH0, if the sensor output S is constant for the predetermined time T0 or more, an exception permitting section, which is the door ECU 10 in this embodiment, permits execution of the calibration.

That is, if the sensor output S of the capacitive sensor 5 has been changed in the same direction as when the object to be detected approaches the emblem 4 for some time, the door ECU 10 preferentially detects the operation input based on the sensor output S. This prevents execution of the calibration from hindering detection of the operation input based on the sensor output S of the capacitive sensor 5.

However, the sensor output S of the capacitive sensor 5 that is changed by the sticking of the foreign matter 60 to the emblem 4 or the removal of the stuck foreign matter 60 does not exhibit fluctuation that is seen with the user's hand performing the operation input. Thus, according to the above configuration, the offset (deviation) of the sensor output S caused by the sticking or removal of the foreign matter 60 to or from the emblem 4 is accurately detected. This is used as the exception requirement, and execution of the calibration is permitted. Thus, the new reference is promptly set for the sensor output S of the capacitive sensor 5 while reducing the power consumption.

(4) In the initial state in which the reference for the sensor output S of the capacitive sensor 5 is not set, the initial calibration section, which is the door ECU 10 in this embodiment, automatically executes the first calibration. After execution of the first calibration, the recalibration section, which is the door ECU 10 in this embodiment, executes recalibration if the sensor output S of the capacitive sensor 5 is changed in the opposite direction from when the object to be detected approaches the emblem 4 and exceeds the predetermined threshold value TH3, which is the recalibration threshold value that is set in the opposite direction, within the predetermined time T3.

That is, if the object to be detected (for example, someone who is leaning on the vehicle 1) is located in the vicinity of the emblem 4, which constitutes the operation input section, during execution of the first calibration, the reference will be set for the sensor output S of the capacitive sensor 5 under the influence of the situation, that is, in a state in which the sensor output S is offset in the same direction as when the operation input is generated. Thus, subsequently, if the object to be detected is no longer located in the vicinity of the emblem 4, the sensor output S is changed in the opposite direction from when the operation input is generated. This undesirably decreases the sensitivity of the operation input detection.

However, the above configuration promptly detects the offset (deviation) of the sensor output S caused by the execution of the first calibration. Thus, the new reference is set for the sensor output S of the capacitive sensor 5 by the execution of the recalibration.

(5) The initial calibration section, which is the door ECU 10 in this embodiment, executes the above-described recalibration if the sensor output S that is changed in the opposite direction from when the object to be detected approaches the emblem 4 continuously exceeds the predetermined threshold value TH3 for the predetermined time T4 or more.

According to the above configuration, the door ECU 10 more accurately detects offset of the sensor output S caused by the execution of the first calibration and appropriately executes the recalibration.

The above-described embodiment may be modified as follows.

The above-described embodiment provides the emblem switch 20, in which the emblem 4 of the vehicle 1 located on the outer surface 3s of the back door 3 serves as the operation input section. When the operation input to the emblem 4 is detected, opening control of the back door 3 is executed.

Instead, the control that is started by the detection of the operation input may be set as required to, for example, locking/unlocking of a door lock. The object to be controlled does not necessarily have to be the back door 3, but may be, for example, the side doors or the hood. Furthermore, the position of the operation input section, which is the emblem 4 in this embodiment, may be changed as required to, for example, the hood or the front grille. The operation input section does not necessarily have to be the emblem 4 of the vehicle 1 as long as the capacitive sensor 5 is located in the operation input section on the vehicle surface.

In the above-described embodiment, if the elapsed time T from the point in time at which the falling waveform after the rising is caused in the sensor output S of the capacitive sensor 5 reaches the predetermined time T2 (T≥T2, step 510: YES), the irregular calibration is executed (refer to FIG. 12). However, such a duration requirement does not necessarily have to be provided. That is, the irregular calibration may be executed immediately after the detection of the falling waveform. The execution requirement for the recalibration in the initial calibration of the capacitive sensor 5 does not necessarily have to be that the sensor output S that has changed in the opposite direction from when the object to be detected approaches the emblem 4 continuously exceeds the predetermined threshold value TH3 for the predetermined time T4 or more (refer to FIG. 13). Instead, the recalibration may be immediately executed.

In the above-described embodiment, upon satisfaction of the exception permitting requirement, the calibration of the capacitive sensor 5 is immediately executed (refer to FIG. 4). However, after the exception permitting requirement is satisfied, the calibration of the capacitive sensor 5 may be executed at the point in time for executing the periodic calibration.

Figure 15:
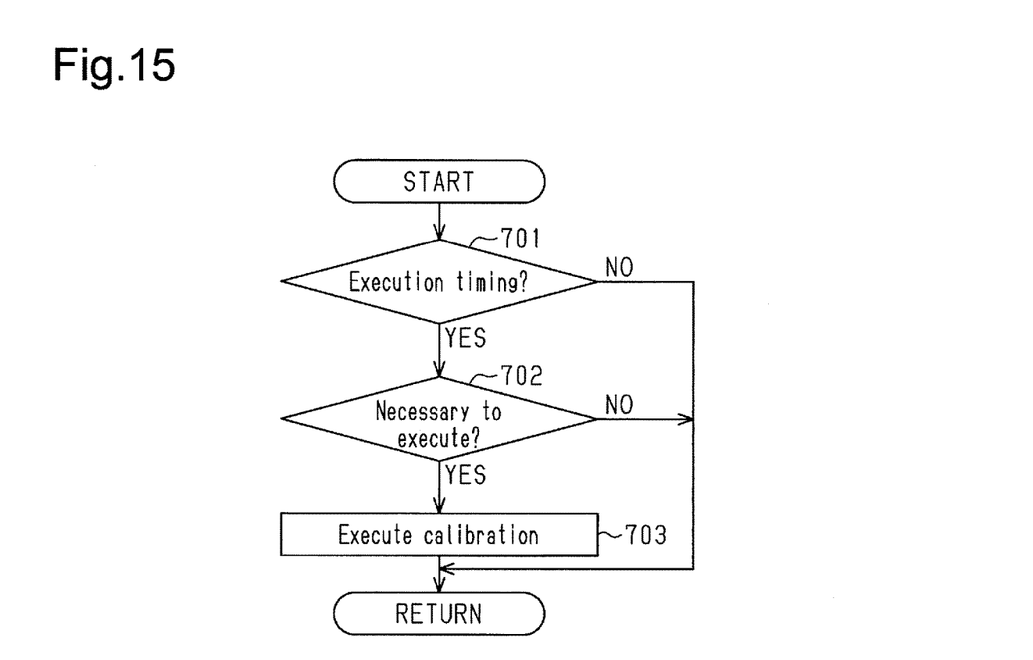
FIG. 15 is a flowchart of calibration according to a modification (execution confirmation determination).

Furthermore, as shown in the flowchart of FIG. 15, at the point in time for executing the calibration (step 701: YES), it is determined whether the calibration of the capacitive sensor 5 is necessary (step 702). For the execution confirmation determination of the calibration in step 702, for example, it is preferably determined whether the capacitance of the capacitor 51 (refer to FIG. 3), which is constituted by the capacitive sensor 5, is stable. Also, for example, the execution of the calibration may be determined to be unnecessary if the point in time at which the irregular calibration is executed is close to the point in time at which the subsequent periodic calibration is executed. In the execution confirmation determination, the door ECU 10 may execute the calibration of the capacitive sensor 5 (step 703) only if it is determined that the execution of the calibration is necessary (step 702: YES).

That is, for example, if an offset is not caused in the sensor output S of the capacitive sensor 5, or if an offset caused in the sensor output S does not greatly influence the operation input of the user, the calibration of the capacitive sensor 5 is not executed. This configuration more effectively maintains the detection sensitivity of the operation input to be reliable while reducing the power consumption.

The invention claimed is:

1. An operation input detection device, comprising:
an operation input section configured to be provided on a vehicle surface;
a capacitive sensor, wherein a sensor output of the capacitive sensor changes as an object to be detected approaches or separates from the operation input section;
an operation input detecting section, which detects an operation input to the operation input section based on the sensor output of the capacitive sensor; and
a sensor calibration section, which executes calibration of the capacitive sensor, wherein
the sensor calibration section includes an irregular calibration section,
wherein the irregular calibration section executes the calibration if the sensor output that has changed in a same direction as when the object to be detected approaches the operation input section exceeds a first threshold value, and the sensor output subsequently changes in an opposite direction and exceeds a second threshold value set in the opposite direction within a predetermined time.

2. The operation input detection device according to claim 1, wherein
the sensor calibration section includes
a calibration prohibition section, which prohibits execution of the calibration if the sensor output exceeds a prohibition threshold value set in the same changing direction as when the object to be detected approaches the operation input section, and
an exception permitting section, which permits execution of the calibration if the sensor output is constant for a predetermined time or more even in a case in which the sensor output exceeds the prohibition threshold value.

3. The operation input detection device according to claim 1, wherein
the sensor calibration section includes
an initial calibration section, which executes a first calibration in an initial state in which a reference for the sensor output is not set, and
a recalibration section, which executes recalibration if, within a predetermined time after the execution of the first calibration, the sensor output changes in the opposite direction from when the object to be detected approaches the operation input section and exceeds a recalibration threshold value set in the opposite direction.

4. The operation input detection device according to claim 1, wherein the irregular calibration section executes the calibration if the sensor output exceeds the second threshold value continuously for a predetermined time or more.

5. The operation input detection device according to claim 3, wherein the recalibration section executes the recalibration if the sensor output exceeds the recalibration threshold value continuously for a predetermined time or more.

6. The operation input detection device according to claim 1, wherein the sensor calibration section includes an execution confirmation determining section, which determines whether execution of the calibration is necessary at a point in time for executing the calibration.

* * * * *